(12) United States Patent
Ambrosi et al.

(10) Patent No.: US 11,799,888 B2
(45) Date of Patent: Oct. 24, 2023

(54) AUTOMATIC IDENTIFICATION OF ROLES AND CONNECTION ANOMALIES

(71) Applicant: HEWLETT PACKARD ENTERPRISE DEVELOPMENT LP, Houston, TX (US)

(72) Inventors: Joao Claudio Ambrosi, Porto Alegre (BR); Victor Hugo Rebelo Rodrigues, Porto Alegre (BR); Alex Ferreira Ramires Trajano, Porto Alegre (BR)

(73) Assignee: Hewlett Packard Enterprise Development LP, Spring, TX (US)

( * ) Notice: Subject to any disclaimer, the term of this patent is extended or adjusted under 35 U.S.C. 154(b) by 532 days.

(21) Appl. No.: 16/434,350

(22) Filed: Jun. 7, 2019

(65) Prior Publication Data
US 2020/0389477 A1 Dec. 10, 2020

(51) Int. Cl.
*H04L 41/069* (2022.01)
*H04L 9/40* (2022.01)
(Continued)

(52) U.S. Cl.
CPC ........ *H04L 63/1425* (2013.01); *H04L 41/069* (2013.01); *H04L 41/12* (2013.01); *H04L 41/28* (2013.01)

(58) Field of Classification Search
CPC ... H04L 63/1425; H04L 41/12; H04L 41/069; H04L 41/28
(Continued)

(56) References Cited

U.S. PATENT DOCUMENTS 8,682,812 B1 * 3/2014 Ranjan ................ H04L 63/1425
706/12
9,225,730 B1 * 12/2015 Brezinski ................ G06F 21/00
(Continued)

FOREIGN PATENT DOCUMENTS

WO WO-2017160409 9/2017

OTHER PUBLICATIONS

Singh, A. et al.; "Jupiter Rising: A Decade of Clos Topologies and Centralized Control in Google's Datacenter Network"; Aug. 17-21, 2015; 15 pages.

*Primary Examiner* — Vivek Srivastava
*Assistant Examiner* — Hien V Doan
(74) *Attorney, Agent, or Firm* — Nolte Intellectual Property Law Group

(57) ABSTRACT

A network topology analysis and validation system and technique are provided. In some implementations, the system may obtain information in real-time mode or as an off-line data set. The information being representative of a defined network topology type for a computer network and communication connections for devices within the computer network. The computer network analysis may be performed on a subnet of a larger network. A communication topology of the computer network may be compared with the expected (defined) network topology using bipartite and bi-colorization techniques to classify nodes of the computer network. After classification, anomalous communication connections (not in conformance with a standard for the defined network topology) may be identified and colored for presentation to a system administrator. Anomalous communication connections may initiate an alert, event, or alarm, via a system administration monitoring system for real-time notification.

17 Claims, 9 Drawing Sheets

(51) Int. Cl.
*H04L 41/28* (2022.01)
*H04L 41/12* (2022.01)

(58) Field of Classification Search
USPC .......................................................... 709/224
See application file for complete search history.

(56) References Cited

U.S. PATENT DOCUMENTS

2013/0074024 A1* 3/2013 Chase .................. G06F 30/398
716/112
2015/0280993 A1 10/2015 Gourlay et al.
2016/0359695 A1* 12/2016 Yadav ..................... H04L 43/04

* cited by examiner

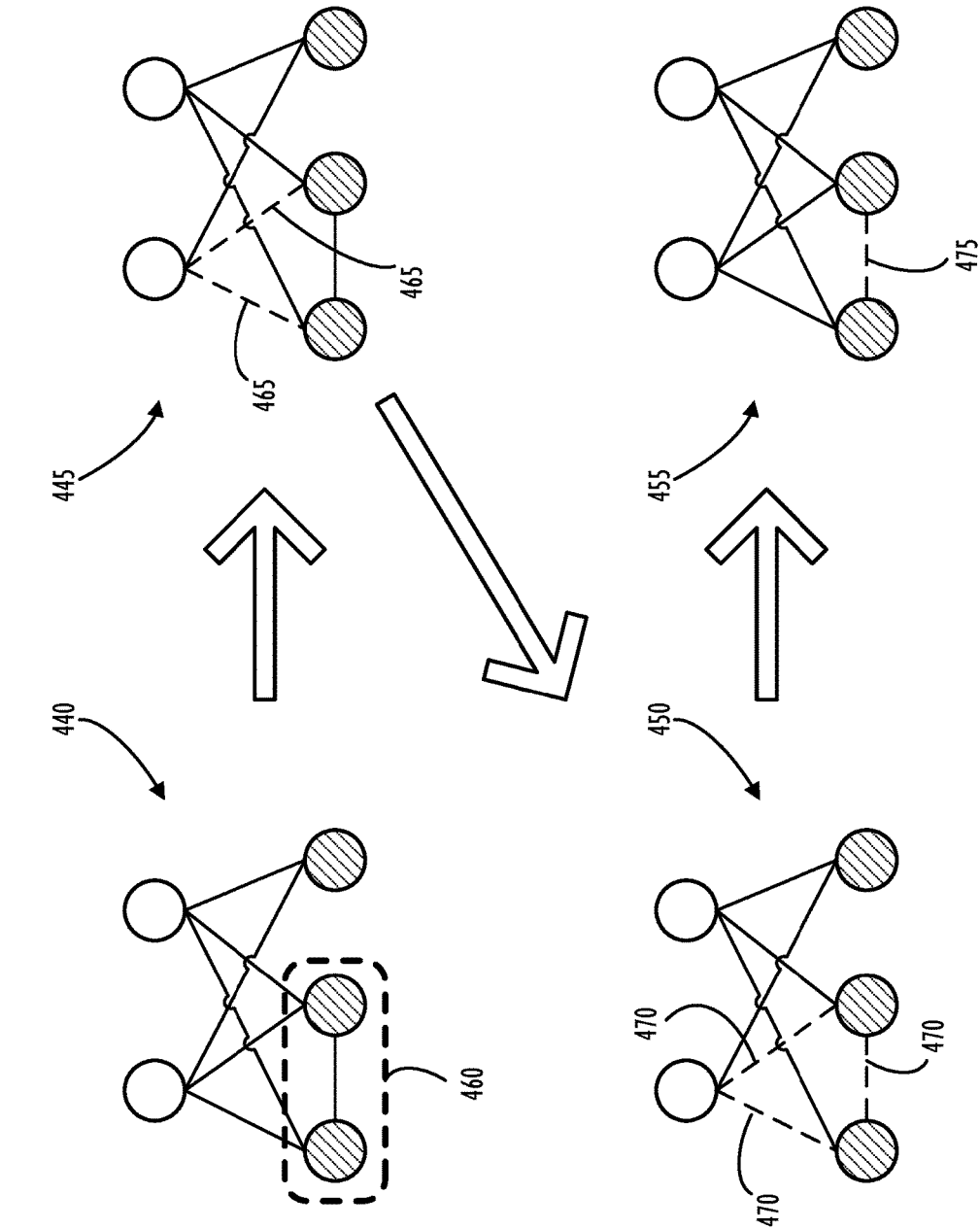

AUTOMATIC IDENTIFICATION OF ROLES AND CONNECTION ANOMALIES

BACKGROUND

Hyper converged and converged infrastructure includes servers, storage, networking, and integrated software and services. These systems are designed to address the cost and complexity of data center operations and maintenance by pulling the information technology ("IT") components together into a single resource pool, so the IT components are easier to manage and faster to deploy. Hyper converged and converged infrastructure have allowed the scale of the deployment of computing devices to become extremely large. Engineering, deployment, operation, administration, and maintenance of modern datacenters, including Cloud systems, are becoming ever more challenging and difficult as the size and complexity of the environment grows.

Computer devices within different networks may be arranged in many different network topologies. Types of network topologies include ring, leaf-spine ("L-S"), star, bus, point-to-point, mesh, etc. Each computer network may be designed by a network administrator to conform to a topology that represents a "best" topology for their design specifications. Different portions of an enterprise network (e.g., "subnetworks", often referred to as "subnets") may have different network topology implementations and be bridged together to create a comprehensive network. With many enterprise networks being implemented to have up to hundreds to thousands of nodes, validating an expected network topology, identification of configuration errors, and reacting to device failures are activities of administration that may be automated by computer analysis techniques to provide increased efficiency, availability and security.

BRIEF DESCRIPTION OF THE DRAWINGS

The present disclosure may be better understood from the following detailed description when read with the accompanying Figures. It is emphasized that, in accordance with standard practice in the industry, various features are not drawn to scale. In fact, the dimensions or locations of functional attributes may be relocated or combined based on design, security, performance, or other factors known in the art of computer systems. Further, order of processing may be altered for some functions, both internally and with respect to each other. That is, some functions may not need serial processing and therefore may be performed in an order different than shown or possibly in parallel with each other. For a detailed description of various examples, reference will now be made to the accompanying drawings, in which:

FIG. 4B illustrates phases of different possible iterations for an anomaly detection algorithm based on a simplified example of a graph representation of a network topology, according to one or more disclosed examples;

DETAILED DESCRIPTION

Figure 1:
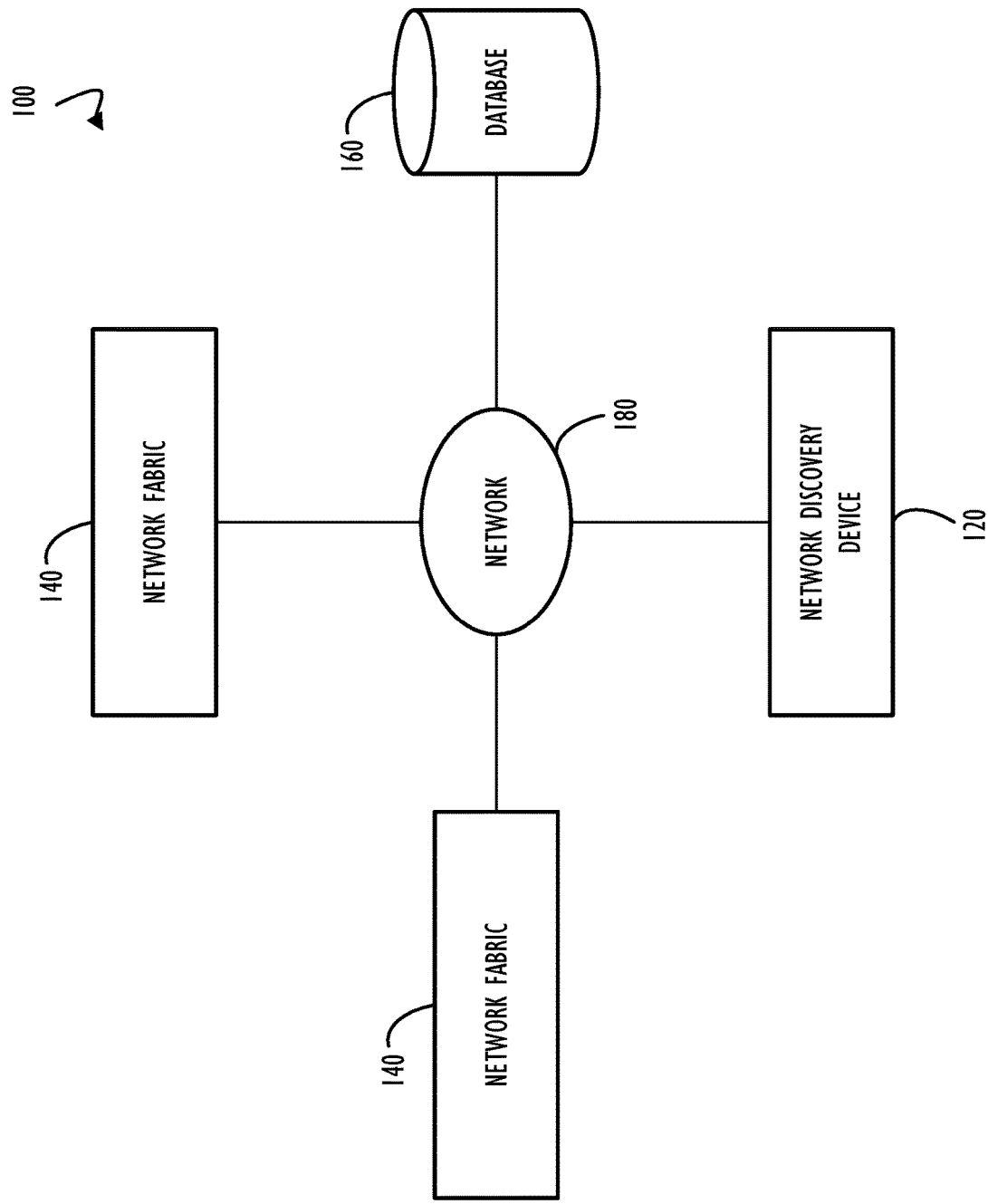
FIG. 1 illustrates an overview of a system to automatically discover network devices, according to one or more disclosed examples.

Illustrative examples of the subject matter claimed below will now be disclosed. In the interest of clarity, not all features of an actual implementation are described for every example implementation in this specification. It will be appreciated that in the development of any such actual example, numerous implementation-specific decisions may be made to achieve the developer's specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

Hyperconverged and converged infrastructure systems (hereinafter converged infrastructure systems) typically provide a single resource pool for IT components within that system. One or more converged infrastructure systems (and other computer systems) may be networked together based on one or more network topologies to provide resources to support enterprise computational needs. In general, converged infrastructure systems may be used to simplify the management and deployment of computational resources. As part of the overall implementation of computer networks, the network fabric may provide for the connectivity between components of the infrastructure to allow an overall solution to function.

One challenge in setting up and administering converged infrastructure systems is that the infrastructure may not be easily remotely managed before a network fabric itself is assembled and functional. As a result, some manual setup for a network fabric may be performed. The manual setup may be time consuming and error prone. Further, setup of a network fabric may include processing of a large amount of information regarding all the connected infrastructure elements. This information may include how different infrastructure components are intended to be connected to the network as well as information about configuration of network protocols and network security.

If errors are introduced at setup it may be difficult (or impossible) to achieve a network fabric in conformance with design specifications. Further, run-time errors, device failures, and improper maintenance (e.g., an inadvertent incorrect network connection or disconnection of two devices through a hardware or software change) may lead to an alteration of a network topology. Techniques to automate and implement discovery of a topology, run-time validation, and off-line validation for a network fabric with respect to an expected topology type are provided herein. In one example, the automatic discovery of all network elements (e.g., network nodes that may be physical or virtual nodes) may include automatic learning of the topological relationships between these network elements. Once discovered, a network topology type may be inferred and used for validation. Alternatively, an expected network topology type may be provided and used for validation.

Network infrastructure hardware includes physical layers (e.g., network wires, radio-frequencies or optical wavelengths with modulation and coding schemes for wireless, fiber-optics and Laser systems, or other communication medium) to function as connections or communication paths, and software configuration settings (e.g., communication routes) that may be initially setup based on design specifications and desired capacities. For example, a set of servers and storage within a set of racks may be connected with power and network connectivity for some desired topology. The desired topologies may be based on standard network architectures as mentioned above. For the purposes of this disclosure a Leaf-Spine architecture (e.g., L-S topology) will be discussed and used for example implementations. However, disclosed techniques may also be applicable to other network topologies.

In some cases, topologies may be configured specifically for the customer's workloads to be run using the infrastructure. Some workloads may have specification criteria based on preferences for performance and/or high availability.

After the physical infrastructure has been setup, software configurations may be applied to the network fabric and infrastructure within to create a logical network within the context of capabilities provided by a physical network fabric This setup may also include configuration of networking protocols and desired settings. Note that wireless network communication is also possible. For the purposes of this disclosure, it may be considered that the lowest level of the Open System Interconnect ("OSI") model (e.g., Layer-1, which is referred to as the "Physical Layer") represents a "physical" connection.

The network device information collected from the automatically discovered network devices may be stored in a database accessible by a plurality of network devices connected to the network fabric. Other sources of network topology data may also be utilized as a source of data for the network topology. These network topology data may be obtained, processed or transformed automatically, or semi-automatically from a network operation, planning or management systems, or even entered manually in a human-readable computer storage format as a description of a network. The input information can be a description of a real or imaginary network or a combination of each for the purpose of experimentation, validation, verification, assessment, analysis, exploration or evaluation of network arrangements. The network topology information may be representative of an extremely large, complex network fabric.

The network topology, in the context of disclosed examples, refers to the organization of connections between discovered network devices to form a network fabric. This topology, if plotted visually or mathematically, may form a graph of connected nodes where each node may represent a network device on the network. The connections between nodes in the graph may represent one or more physical connections of any type between the network devices represented by the nodes. Using the above-referenced analysis of roles and connections (e.g., graph analysis) potential improper placement of nodes (specifically switching network devices) and connections between nodes may be automatically identified.

Examples of systems to automatically discover network devices and device connections (e.g., network communication links) are provided herein. Further, techniques to validate a network topology against an expected (or inferred) topology are also provided. Still further, an off-line network analysis technique is disclosed that may be used to validate a planned network design, a remote network or may be used as part of analysis for historical errors (e.g., post-mortem analysis) of previous network or software issues. Overall, disclosed systems and techniques represent an improvement to the art of system administration and may provide an improvement to the functioning of the overall computer network.

In some implementations, the disclosed system may include one or more of: a discovery engine; a record engine; a topology engine; and a network topology analysis engine. The discovery engine may enable a network device discovery protocol with a transmit mode and a receive mode on a network discovery device. The discovery engine may also enable an auxiliary communication protocol on the network device. The record engine may broadcast one or more network device discovery protocol records from the network device to determine local neighbors and connectivity information. The topological engine may process topological information using one or more communication protocols and timing cycles to update age for a set of topology information records. That is, the topological engine may collect information to determine one or more possible topologies present within an enterprise network (or portion thereof). The network topology analysis engine may utilize information about actual communication connections (e.g., a discovered topology based on network communication) and validate that topological information against an expected topology to detect possible errors. The possible errors may include incorrect physical connections between devices. The possible errors may also include identification of incorrect configuration settings that allow communication on network paths that are expected to be disabled (e.g., communication prevented via a software or hardware configuration setting).

Analysis of network topology information (obtained in various manners as discussed herein) may be performed to automatically identify a role of a device within a defined network topology (e.g., leaf-spine). Based on the automatically identified role, possible errors (e.g., improper and absent connections or communication paths between nodes) with respect to the expected network topology may be identified. Errors may be identified using techniques to identify the subsets of vertices and utilizes an equivalence between bipartite graphs and bi-colorable graphs. All nodes may be colored with one of two possible colors in such a way that once a color is assigned to a vertex, all its adjacent vertices will be assigned the other color. After all vertices have been colored according to this process, the algorithm may be able to precisely identify the two disjoint groups of non-connected vertices (e.g. as described previously, network devices on a given layer are not connected to network devices on the same layer) on the given graph, in this case a network fabric topology graph that represents the connections between network devices in the network fabric. Following the classification of vertices into subsets, identification of the role of the nodes as represented in the topology graph may be performed.

A computer communications network fabric, in the context of this disclosure, represents an electronic communications network that employs defined protocols intended to provide or serve as the means to communicatively interconnect a given set of network devices. Each set of network devices may be utilized as compute, storage, and infrastructure equipment to process information. Network devices may be arranged as local, remote, or a combination of local and remote. Network devices may also provide compute resource installations that are further organized into either centric, edge, or distributed topologies.

In general, infrastructure components may be provided as a cloud system (private, public and hybrid), a datacenter, a cluster, or a farm of compute servers (among other names as known in the art). Network devices and connections may be considered and represented as either physical or logical network environments. Network devices may be implemented using converged systems, hyperconverged systems, traditional servers, switches, routers, etc. In some cases, network devices may be virtual devices executing on underlying physical hardware of other devices.

In some implementations, software, firmware or platform logic (such as using a field-programmable gate array ("FPGA") board) may be used to implement disclosed techniques to assist in performing detection of specific physical and logical network configuration errors and problems (e.g., using graphical topological analysis). In some implementations, monitoring functions for automatic network device discovery may be executed continuously in near real-time mode. In such an implementation, the identification of network device role and detection of possible anomalies may be achieved almost instantaneously.

Thus, disclosed techniques may be helpful to identify run-time issues. For example, a run-time issue may result from a network device failure or a configuration change, such as the removal or addition of a network cable. The topology validation and detection of anomalies may assist with network engineering tasks, operations, and maintenance of a network having an overall goal of providing performance, security, and availability for a network infrastructure.

The examples of this disclosure illustrate methods to create or extend concepts of network topology analysis and represent an improvement to the art of support engineering, operations, and maintenance of computer networks. Methods, algorithms, and techniques are described herein with respect to automatically analyzing a L-S network topology. The same methods used to analyze a L-S network topology may also be applied to other types of network topology.

In some examples, the methods may infer the role of each network device in the network topology (or the topology itself). This inference capability may be extended to perform additional functions such as inferring the composition of the network layers, detect abnormal, absent and nonstandard physical connections (e.g. "anomalous connections") between network devices, and make it easier to pinpoint abnormal logical placement of switching devices as well as odd (e.g., non-standard or untraditional) arrangements of devices and connections.

While many of the functions of an automated anomaly detection with respect to network topology may be related to the operation of the network, additional functions such as off-line analysis for a network being analyzed may be helpful for design and deployment of hypothetical (e.g., future) networks. A topology generated from the automatic network device discovery and coupled algorithms, for example, may be exported from a computer system connected to the network and later imported to a computer system that is not connected to the network. This export (or off-line) function may allow the analysis and recommendations to be executed remotely by network administrators that may be isolated from connecting to the network.

There are many standard network architectures consisting of topologies, models, and connection patterns for arranging a datacenter local computer network. These architectures may guide the physical organization of the network devices (e.g. switches, routers, or any other device connected to the network) with respect to several design factors. These design factors may be represented both in terms of the number of layers and the role of each layer. Further, how devices from a layer will be connected to other elements in the network fabric, the outside world (e.g. the Internet or any other public network), and other network fabrics may be considered. For example, an L-S architecture is a hierarchical architecture where there are two defined layers, the bottom layer, with the network devices at this layer having the role of "leaf", and an upper layer with network devices at the upper layer having the role of "spine."

In an L-S network topology, one basic rule is that network devices from one layer do not directly connect to other network devices of that same layer. Instead each network device is supposed to be connected only to each and all network devices at the other adjacent layer and vice versa. The leaf layer, which in most cases is typically comprised of Top of Rack ("ToR") switches (although it is not limited to ToR switches), will normally also connect to the physical network endpoints such as compute and storage servers or clients.

The spine layer may also connect to an additional higher layer which may provide connection to other fabrics or to the outside world. This higher layer may not be technically considered as part of a L-S layer as it may represent a separate network portion. For example, a subset may be configured using an L-S topology and connect to other portions of an overall network that are not intended or expected to be implemented using the L-S architecture.

When network devices are wired and configured as multiple redundant network devices to provide higher availability, such as a redundant 1:1 mode, a set of one or more network devices may be considered as one logical network device that conforms to the network topology rules for the network (e.g. L-S) described above. A connection topology of a fully conformant L-S network topology may be represented as a bipartite graph. A bipartite graph, by definition, is a graph with two disjoint subsets of vertices. Each vertex may be grouped to a first subset A and a second subset B that may each then correspond to the upper and lower levels mentioned above.

For example, every edge connects a vertex (e.g. a graph node) in subset A to a vertex in subset B. Similarly, a conformant L-S network topology will have connections only between elements of different network layers, such as the previously described topology with the spine network devices as the first subset on the top layer, and leaf network devices as the second subset on the lower layer. Each and every spine network device should be directly connected with every leaf network device.

To identify anomalies in the network topology (e.g. connections between network devices on the same layer), the techniques of this disclosure may be implemented to allow an analysis function to separate and identify devices of the two groups (e.g. spines and leafs) in the expected L-S topology. After completing a classification of the devices, additional analysis may be performed to identify anomalies (e.g., suspected improper or missing network communication paths) with respect to the expected network topology.

In accordance with some examples, classifying the roles of each network device may be performed using two sequential functions. A first function may be used to identify two disjoint subsets of vertices (e.g. separate each node of the graph into subsets where the nodes in each subset serve the same purpose). A second function may then further classify each subset as containing nodes representing leaf or spine network devices.

The techniques used to identify the subsets of vertices may rely on an equivalence between bipartite graphs and bi-colorable graphs. Accordingly, it may be possible to execute a bi-coloring algorithm based on a depth-first search ("DFS") graph traversal technique. In such an implementation, all nodes may be colored one of two possible colors in such a way that once a color is assigned to a vertex, all its adjacent vertices will be assigned the other color. After all vertices of a graph representation have been colored accordingly, the algorithms may be able to precisely identify the two disjoint groups of non-connected vertices (e.g., as described previously, network devices on a given layer should not be directly connected to network devices on the same layer). The resultant graph may then be used to identify anomalies. In this example, the resultant graph represents a network fabric topology graph that is based on communication connections between network devices in the network fabric. In some examples, a visual colored representation may be presented (e.g., on a display device) to a system administrator and allow them to quickly perceive identified anomalies.

Following the classification of vertices into subsets as described above, still further automated analysis may be used to further refine information. For example, prior to providing information to a system administrator, further analysis to refine results may be performed. For example, identification of the role of the nodes in each group may implement an algorithm that utilizes one or more assumptions based on historically observed attributes of traditional L-S network topologies. For example, one assumption may be derived from historical norms that indicate there are typically more physical endpoint devices (e.g. compute nodes, storage servers, etc.) connected to leaf network devices than are connected to spine network devices.

Accordingly, when initially assigning a leaf attribute to a vertex, the number of connections to that vertex that represent endpoint devices may be considered. Other elements in the subset classification may include, but are not limited to: the number of leaf network devices are typically greater than or equal to the number of spine devices; most virtual local area network ("VLAN") access interfaces typically reside on leaf network devices while spine network device have more trunk than access interfaces; spine network devices typically have network interfaces that tend to offer more bandwidth capacity than network interfaces on a leaf network device; spine network devices tend to have more computing power than leaf network devices; and the number of network interfaces on leaf network devices it typically greater than the number of network interfaces on spine network devices.

Artificial intelligence techniques may be used to support the above referenced classification algorithms. Further, data used to support current and future classifications may be collected as part of the automatic network device discovery methods described throughout this disclosure. Weights may be assigned to each evaluation attribute to provide a relative prioritization for the above mentioned properties and assumptions. A weighted comparison and matching criteria may be applied to precisely infer which of the groups contains the spines. The subset of vertices corresponding to network devices with a higher score, and equal, near, or similar configuration may be assumed to be the spine network devices. The other subset of vertices may therefore be considered to contain vertices representing leaf network devices.

Once the network devices are separated into subsets and the spine and leaf subsets are identified, it may be possible to continue evaluation of the network topology and detect network anomalies (e.g., improper or missing network connections). A first phase of this further evaluation, according to some disclosed examples, may be to identify devices that are in violation of a strictly defined L-S network topology architecture. This identification may utilize the same set of physical network device properties (e.g., spine nodes have network interfaces providing a higher bandwidth, VLANs interfaces typically are found on leaf nodes, etc.) utilized in the "assumptions" application phase mentioned above that may have been used to classify the network devices into role subsets. These physical properties may be utilized with the same or different combinations of assumption criteria (with or without weighting) to identify network devices that may represent a connection that violates the rules of placement or configuration for a single role (e.g. spine or leaf vertex) in the fabric. For example, network devices not matching selected criteria may be marked or labeled (e.g., noted with an attribute in the mathematical graph representation or a visual indicator in a visual depiction of the graph) with "unknown role" in the fabric.

The classification and labeling of graph nodes, as disclosed herein, may help allow a system administrator or assist further automated analysis to promptly locate potential errors or nonstandard configurations for network devices and connections in the network. The selected criteria may be configured and tuned to give more weight to some properties, such as the device hardware grade, the connectivity capacity, and to other characteristics so that the evaluation may be adjusted to a particular fabric and environment. This adjustment of criteria weights may increase the accuracy and sensitivity to detect anomalies and avoiding false positives. In some implementations, a run-time monitoring system may have a learning model that may allow the learning model improve efficiency of that model over time.

In some implementations, graph bi-coloration properties may be used to identify anomalies in a L-S network topology (e.g., detection of devices on the same network layer that have a direct communication connection in violation of L-S network topology standards). In accordance with the bipartite graph properties, this may be detected as a topological error because two of the same color nodes in the graph (each node corresponding to a network device) have a direct communication connection. Once a topological error is detected, further identification may be performed to specifically determine a connection that represents an incorrect or unexpected connection (considering the L-S network topology) from possibly many connections of a device. That is, a single network device may have multiple connections (e.g., through multiple ports or interfaces) to the network fabric and not all of the multiple connections may be a cause of the anomaly.

To identify incorrect or unexpected connection between same color nodes, it is noted that the bipartite graph problem may be considered equivalent to an odd cycle graph problem. A graph is said to be bipartite, if and only if, the graph has no odd cycles. In this context, cycles refer to the concept where a vertex on a graph can be visited more than once as the graph is traversed using a graph traversal method such as depth-first or breadth-first. If a vertex is visited more than once in a traversal, a cycle in the graph must exist. Odd cycles, in this context, refer to the count of edges (e.g. the connection between vertices) traversed to complete the cycle. If the number of edges traversed is not evenly divisible by two, the cycle is an odd cycle. So, if the number of edges traversed in a cycle is an odd number, then the cycle is an odd cycle. Using odd cycles as a detection mechanism during bi-coloring phase of the network device classification described previously, disclosed techniques may identify which is the incorrect or unexpected connection among the connections forming the odd cycle.

Once two directly connected network devices on the same network layer are detected, a determination of the shortest even path between these two nodes that excludes the direct path connection between them may be performed. Once the shortest even path is found, the odd cycle on the fabric may be located by adding back the direct connection between the two network devices. Using the odd cycle equivalence, disclosed techniques may further remove all the odd cycles on the fabric to have a bipartite graph. The bipartite graph may then be used to bi-color the network devices of the fabric. To remove all odd cycles, disclosed techniques may remove one of the connections from the odd cycle and perform the bi-coloring process again. This may be repeated until all the odd cycles are removed to achieve a bipartite graph. The removed connections may be flagged as an anomaly on the network fabric topology because those connections would prevent the original detected fabric to be represented as a bipartite graph and thus as a proper conformant L-S network topology.

According to disclosed implementations, after all anomalies in the network topology are detected, the result may be data in the form of a graph representation that depicts an accurate adjusted representation of the network fabric. This adjusted representation may have spine network devices, leaf network devices, unknown network devices, improper and absent connections (i.e., anomalous connections) all identified. The adjusted representation may be presented on a display device for further analysis by a network engineer. This analysis may be performed as part of the design, installation, operation, or any other activity involving the management of the network. This analysis may also be automated, for example, as part of a run-time anomaly detection process that may generate events, alerts (e.g., to an enterprise management system) or to initiate further actions, such as emitting a work order for, for instance, requiring a field technician to make changes in the equipment or cabling to restore, modify, or improve the network fabric operation. The analysis may also recommend new connections or communication paths on topology considering a set of standards, that may have been predefined by the network administrator (e.g., to have a full L-S topology each spine must be connected to all leaf nodes, then the analysis may recommend the creation of missing connections or communication path between a spine and a leaf node). Artificial intelligence techniques may be used to support the previous analysis to achieve an improved topology arrangement (e.g., such as redundant paths or improved paths between critical nodes on topology).

Referring now to FIG. 1, an overview of a system to automatically discover network devices according to one particular example is illustrated. System 100 may be implemented in a number of different configurations without departing from the scope of that which is claimed below. In FIG. 1, system 100 may include a network discovery device 120, at least two network fabrics 140, a database 160, and a network 180 for connecting network discovery device 120 with database 160 and/or network fabrics 140. In the example of system 100, network fabrics 140 may be considered a network or portion thereof. For example, a portion of a network may be representative of a subnet that is part of a larger computer network. Further, network fabrics 140 may represent a physical network or a logical delineation implemented on a physical network (e.g., some physical connections may be disabled or blocked and therefore considered to not exist for the logical network).

Network discovery device 120 may be a computing system that performs various functions consistent with disclosed examples, such as automatically discovering network devices. For example, network discovery device 120 may enable a network device discovery protocol, such as a Link Level Discovery Protocol, with a transmit mode and a receive mode on an instance of a network device (not separately shown), referred to here as a "first" network device. Network discovery device 120 may also enable an auxiliary communication protocol, such as a Simple Service Discovery Protocol, on the first network device. Network discovery device 120 may also determine if an address is allocated for a management interface on the first network device. Prior to enabling the network device discovery protocol, network discovery device 120 may determine if the first network device is provisioned for use on network 180.

Network discovery device 120 may broadcast the network device discovery protocol records from the first network device including local neighbors and connectivity information. Network discovery device 120 may process topological information using the auxiliary communication protocol and timing cycles to update age of a set of topology information records. For example, network discovery device 120 may mark topological information regarding the age of stored records and inventory. For example, when no renewing information is received from each network device on a network during a first period of time, those devices not providing renewing information may be aged. Aged devices may be assigned a first marker, such as a stale identifier. When it is determined that no renewing information is received from a network device on a network during a second period of time, network discovery device 120 may mark that network device with a second marker. The second marker may include an obsolete identifier. Once identified as obsolete, the network device may be disregarded in all active operations and current topology representations. In the example of system 100, the two network fabrics 140 may be representative of any two network connections using two protocols: a network device discovery protocol (e.g., link-level discovery protocol) and an auxiliary communication protocol (e.g., simple service discovery protocol). Information identified by these protocols and any associated information or records may be stored in database 160.

Database 160 may be any type of storage system configuration that facilitates the storage of data. For example, database 160 may facilitate the locating, accessing, and retrieving of data (e.g. Software as a Service "SaaS", Structured Query Language "SQL", or other databases; and XML files or other file-based data stores, etc.). Network discovery device 120 may populate database 160 with database entries generated by network discovery device 120 that are stored as database entries in database 160. Database 160 may be populated with different types of information that were obtained by a number of methods. For example, database 160 may be populated with network device discovery protocol records, configuration information, etc. Database 160 may contain information obtained via manual entry, data file transport (e.g., upload), automatic discovery, or by other means of obtaining information for storage and use.

Network 180 may be any type of network that facilitates communication between components, such as network discovery device 120, network fabrics 140, and database 160. For example, network 180 may be a local area network ("LAN"), a wide area network ("WAN"), a virtual private network, a dedicated intranet, the Internet, and/or a wireless network. In the context of the example of system 100, network 180 represents a support network as opposed to a network under investigation. However, it is entirely possible that a topology of network 180 may be concurrently used as a support network and be a network under investigation. In this instance, the topology of network 180 may be a source of information to form one of network fabrics 140.

System 100 represents one example implementation; other implementations may be possible in a number of different configurations. For example, while system 100 includes one network discovery device 120, two network fabrics 140, one database 160, and one network 180, system 100 may include any number of these components (as well as other components not depicted). System 100 may also omit one or more of the illustrated components. For example, network discovery device 120 and network fabrics 140 may be directly connected instead of being connected via network 180.

Figure 2:
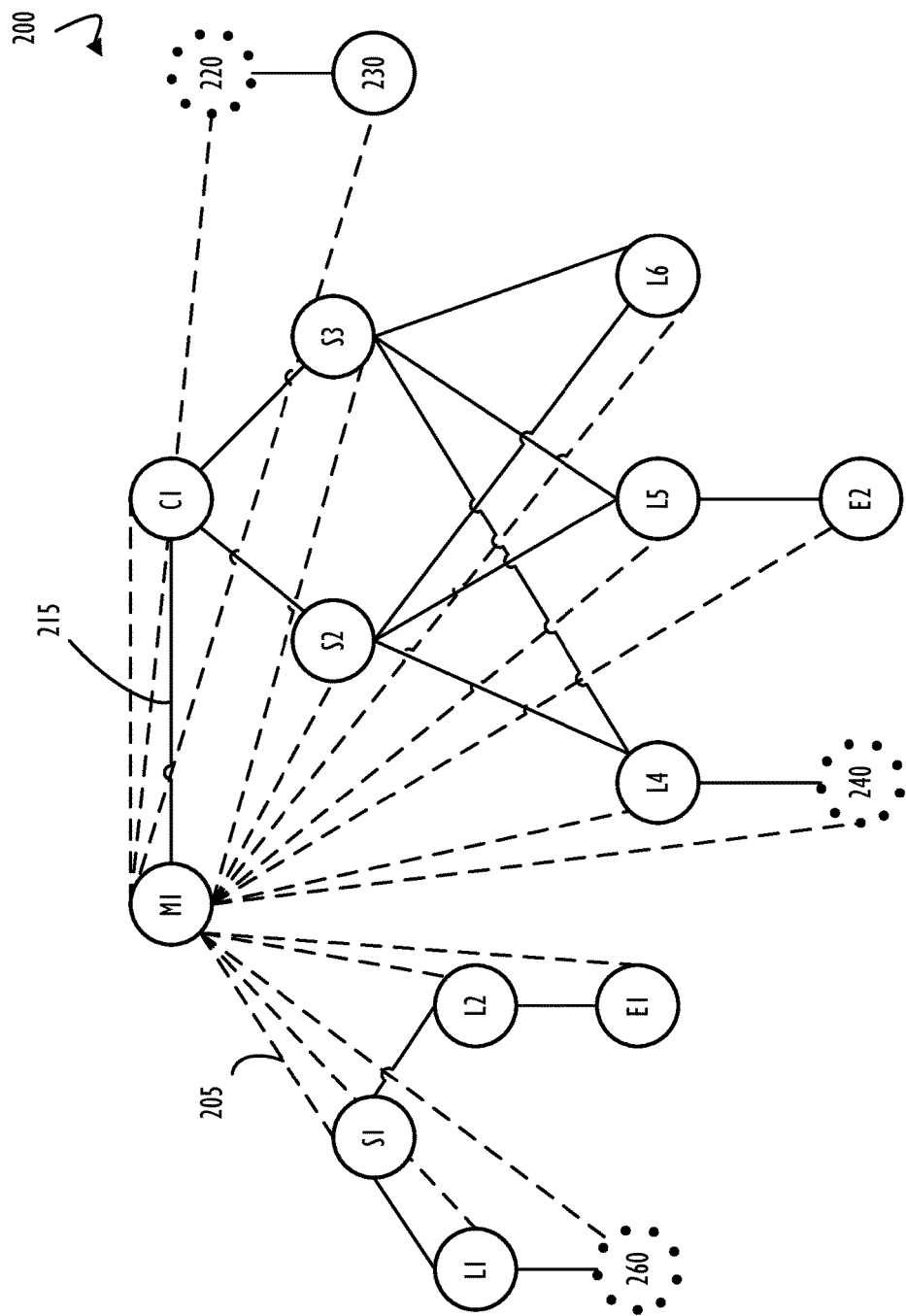
FIG. 2 illustrates a network topology that is represented in a graph format based on information obtained using a network discovery device, according to one or more disclosed examples.

FIG. 2 illustrates a network topology 200 that, in this example, has been successfully processed for all discoverable network devices ("DND") identified by a network discovery device (e.g., network discovery device 120), according to one or more disclosed examples. Network topology 200, in this example, includes multiple layers of nodes where some nodes represent DNDs that perform the function of switch devices within a network (not shown). Nodes that may be discovered by a network discovery device (i.e., DNDs) include devices that are at least rudimentarily active on a network segment and may include network switches and routers, both physical and virtual devices, and any other network-connectable devices, such as virtual machines, containers, physical servers, workstations, and storage units, among other equipment. One or more network discovery devices may be implemented out of other types of network elements (e.g., DND devices) that perform networking functions and have been equipped with logic to perform the automatic discovery techniques of this disclosure.

A network may further include non-enabled or non-capable devices. As used herein a non-enabled or non-capable device represents a network device that does not respond directly to network discovery protocols and may be detected as present in the network using techniques in addition to those performed by a network discovery device. Thus, a network fabric (see network fabrics 140 in FIG. 1 and discussed below) may consist of three classifications of networked devices. Namely, a first class of machine that acts as a network discovery device, a second class of machine that is a DND device that responds to discovery queries directly, and a non-enabled device that may be detected as present via additional network monitoring techniques. In any case, no matter how devices are discovered on the network fabric, disclosed techniques may be used to validate an expected (or inferred) network topology.

In general, a network discovery device (e.g., network discovery device 120) may be implemented on a device that is physically or logically connected to the network fabric, powered-up, and configured for network communication. For example, network discovery devices may have a self-discovery function as an add-on feature. Network discovery devices and DNDs may also have access to a Dynamic Host Configuration Protocol (DHCP) function in the network or have the capabilities for functioning in Internet Protocol v6 ("IPv6") link-local mode. As described above, a DND is a network element (e.g. network device such as a switch, a server, etc.) that is enabled for self-discovery and also to maintain and share connectivity and topology information (even if not configured to perform the additional network discovery functions described herein).

In the example of system 200, node M1 may represent a simple management network switch device that connects to all the network hubs, switches, bridges and routers that make up a management network. A management network represents an additional network (either logical or physical) that is used to share management and configuration information (rather than operational network data to support computer applications) and is illustrated in system 200 by management connections 205 (dashed lines) that connect with the other nodes of system 200. As illustrated in system 200, node M1 is connected via management connections 205 to other network discovery devices, such as nodes C1, S1-S3, L1-L6, and E1-E2. Node M1 is also connected via management connections 205 to some non-capable or not-enabled devices (illustrated as dotted circles in system 200), such as node 220, node 240, and node 260.

Node C1, in the example system 200, may have a core role and includes a connection to the management node M1 via management connection 205 and one of service or production connections 215 (illustrated as solid line connections) with nodes S2 and S3 having spine roles. Nodes M1 and C1 may also participate as nodes in a spine role of the network in addition to participating in the management of nodes via the management connections 205. Based on the connections illustrated in example system 200, some nodes do not conform strictly to a L-S topology depending on their role. For example, if node C1 is assigned a spine role it may be identified as missing connections because it is not illustrated as connecting to all leaf nodes. Nodes S2-S3, having the spine role, are connected to leaf role nodes L4-L6 via a respective one of service or production connections 215. Node 220 (which is assigned a leaf role in this example—e.g., a "leaf role node") is a non-capable or not-enabled device connected to a network discovery device (e.g. capable and enabled node 230). Leaf role node L4 is connected to a non-capable or not-enabled device 240 via one of service or production connections 215 and leaf L5 is connected to extension node E2 via one of service or production connections 215. Similarly, spine node S1 is connected via respective service or production connections 215 to leaf role nodes L1-L2. Node L1 is connected via service or production connections 215 to a non-capable or not-enabled device 260 and L2 is connected to extension role node E1 via one of service or production connections 215.

An accurate topology representation may be established even when non-capable or not-enabled devices (e.g. devices either without discovery functionality, or that function is not-enabled or malfunctioning) are present, given they are not spine elements. Further details of discovery are discussed in more detail in U.S. patent application Ser. No. 15/721,677, entitled "Automatic Discovery," filed Sep. 29, 2017, which is incorporated by reference herein in its entirety for all purposes as if set forth herein verbatim.

Figure 3:
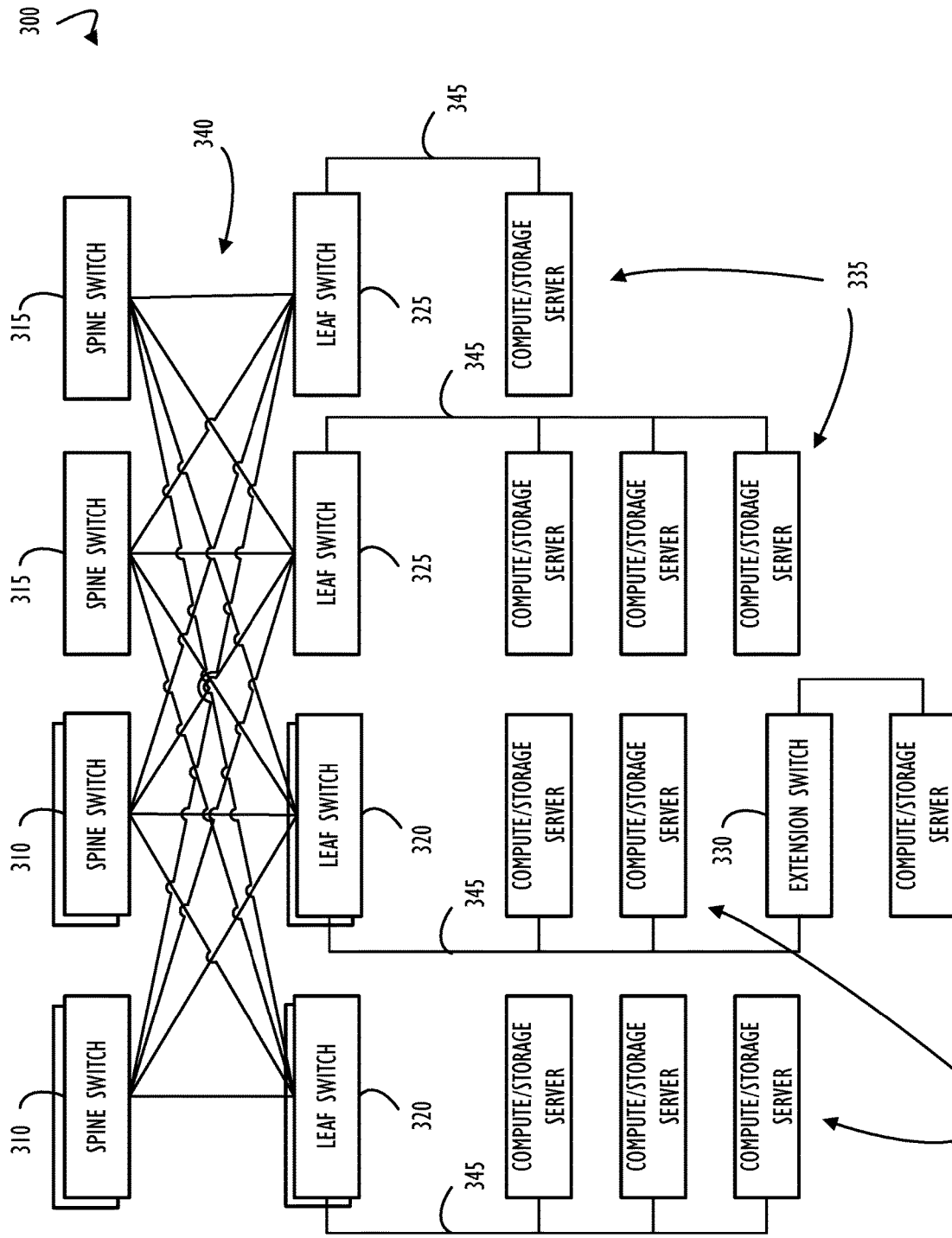
FIG. 3 illustrates an example network fabric arranged as an example of an L-S network topology, according to one or more disclosed examples.

Referring now to FIG. 3, an L-S network topology 300 of an example network fabric is shown in accordance with the disclosed examples. For example, topology 300 may be derived as a network fabric that may be discovered from a topology of networks such as that illustrated in system 200. However, please note that topology 300 is not intended to be directly derived from system 200 for this example.

As illustrated in topology 300, multiple network devices such as spine switches 310, 315 and leaf switches 320, 325 are displayed with interconnections 340 in accordance with a standard and conformant L-S network topology. In this example, connections are only between nodes of each network layer (where the spine switches 310, 315 and the "spine" layer and the leaf switches 320, 325 are the "leaf" layer) to form a conformant L-S network topology. In topology 300, spine switches 310 are illustrated as multiple devices in a redundant configuration and spine switches 315 are illustrated as devices in a non-redundant configuration. In both redundant and non-redundant configurations, the devices may be treated such that they appear as a single network device to other network devices connected to the network fabric 300. Similarly, leaf switches 320 are illustrated as multiple devices in a redundant configuration and leaf switches 325 are illustrated as devices in a non-redundant configuration. As with the example spine switches 310, 315, the devices may be treated such that they appear as a single network device to other network devices connected to network fabric 300 in both redundant and non-redundant configurations. For example, when validating a network topology for conformance to a standard, a pair of devices configured as primary/backup to each other (e.g., for redundancy purposes) may be treated as a single network device. This treatment is proper, in part, because only one of the primary/backup pair is expected to be performing an active (e.g., primary role) on the network at a given time.

Continuing with FIG. 3, topology 300 illustrates network devices operating as leaf switches 320, 325 having various compute/storage servers 335 connected to leaf switches 320, 325 via respective ones of network connections 345. These compute/storage servers 335 may provide normal compute functions for end-users (e.g. desktop computers, laptops, servers, network attached storage ("NAS"), file shares, etc.) Optional extension switches 330 may also be connected to leaf switches 320, 325. Extension switches 330 may allow a larger number of compute/storage servers 335 to be connected in proximity to a leaf switch such as leaf switches 320, 325.

Figure 4A:
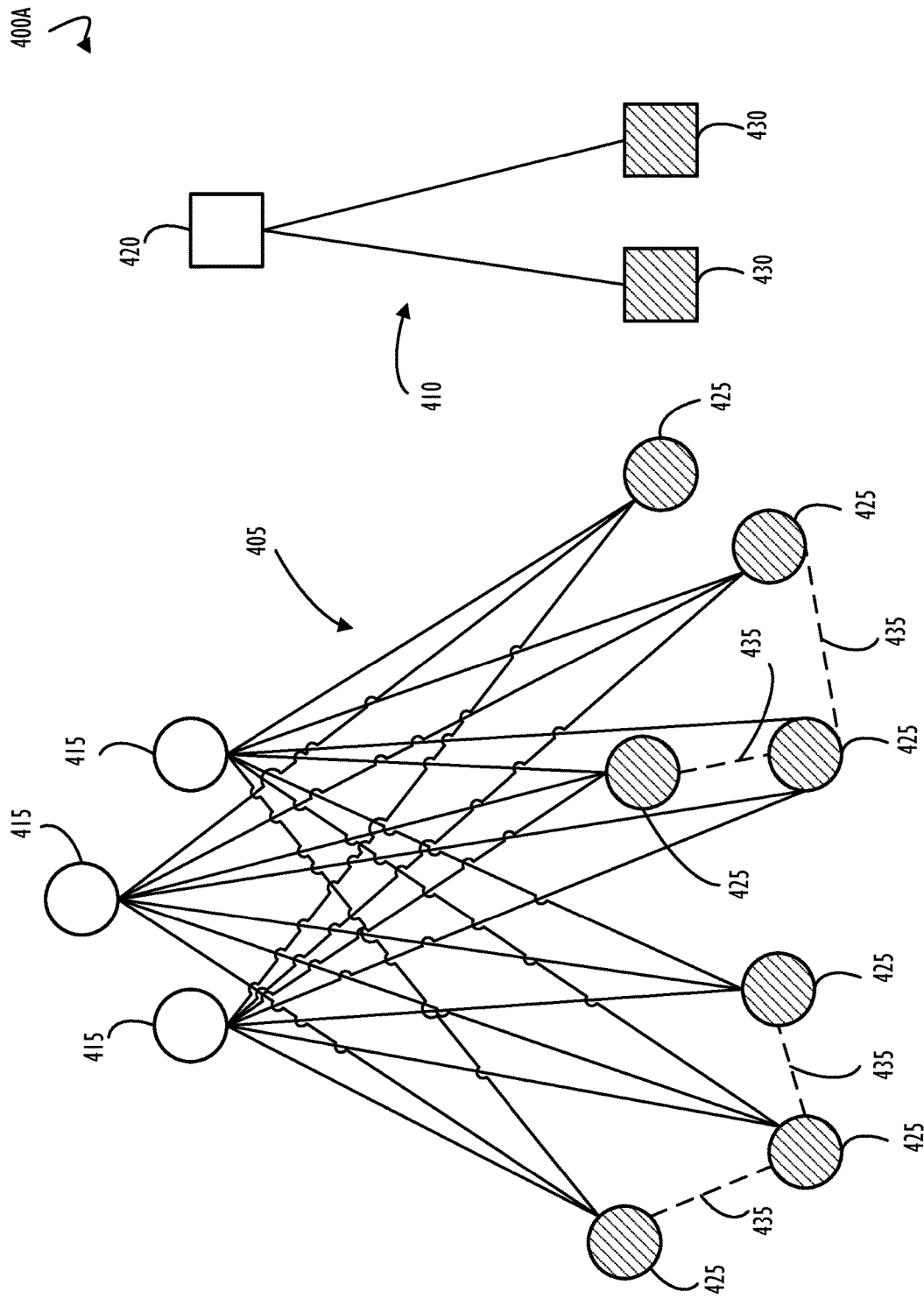
FIG. 4A illustrates a graph depicting possible results of a discovery process on an enterprise network that results in two example network fabrics that each may be expected to conform to an L-S network topology, according to one or more disclosed examples.

Referring now to FIG. 4A, an illustration of a graph depicting a first example network fabric represented as a first graph 405 and a second graph depicting a second example network fabric represented as a second graph 410 are provided. Each of first graph 405 and second graph 410 illustrate a topology following the L-S network topology for network 400A. The L-S network topology of graph 405 and graph 410 may have been established from data collected during the automatic network device discovery and subsequent role classification and anomaly detection techniques of this disclosure discussed above.

In the example of FIG. 4A, network devices having an assigned role of spine 415 for first graph 405 are illustrated as empty circles. Network devices having an assigned role of spine 420 for second graph 410 are illustrated as an empty box. Leaf nodes 430 for second graph 410 are illustrated as hash-filled boxes. Leaf nodes 425 for first graph 405 are illustrated as hash-filled circles. Anomalous connections 435 are illustrated as dashed lines between network devices in the same role. Note, as explained above, anomalous connections represent direct connections between two nodes having the same assigned role. This condition of devices having the same role and having a direct connection is considered improper for a L-S topology.

Referring now to FIG. 4B, a graph annotation sequence 400B is illustrated to explain possible determinations that may be made for different iterations of an anomaly detection algorithm in accordance with disclosed techniques. In the initial step of the graph annotation sequence 400B, graph view 440 indicates two of the same color graph nodes at area 460 (e.g. network devices assigned a common color based on the above discussed bi-colorization analysis). The two nodes at area 460 may be selected for further analysis. As illustrated at graph view 445, the shortest even path 465 is detected between a connected graph node in another network layer and the two selected graph nodes at area 460. This shortest even path between two layers is illustrated in graph view 445 as two dashed line connections 465.

In subsequent graph view 450, an odd cycle 470 (as indicated by the three dashed lines that form odd cycle 470) is detected in the graph. The odd cycle 470, in this context, means an odd number of connections found between a subset of nodes in the graph. In the next subsequent graph view 455, the even cycle 465 (from graph view 445) is compared with the odd cycle 470 (from graph view 450) to detect the anomalous connection 475. For example, connections that exists in the odd cycle and are not present in the shortest even path may represent anomalous connections.

Figure 5:
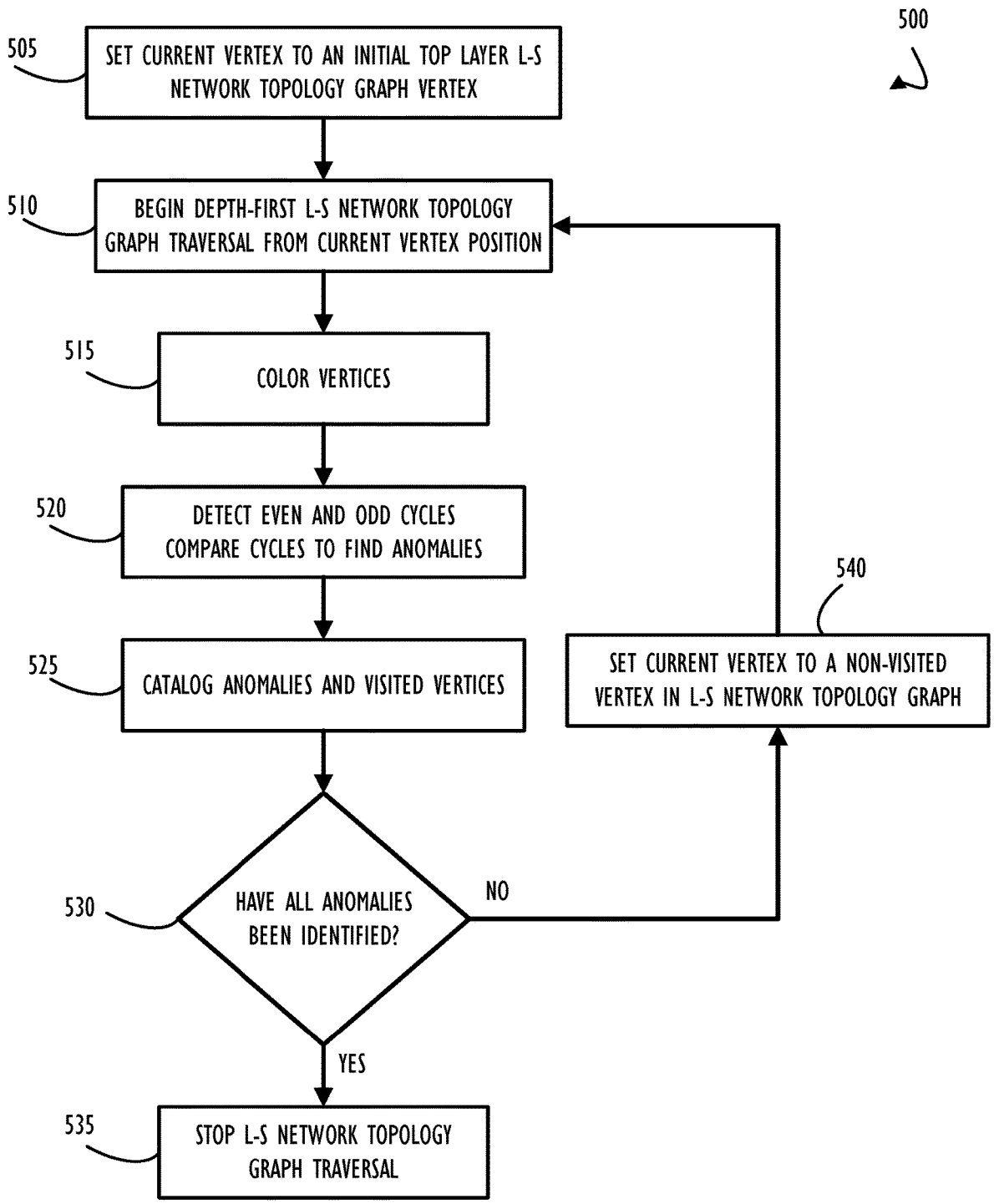
FIG. 5 illustrates an example method illustrating an automated technique (e.g., computer-implemented algorithm) that may be used to detect anomalies in an L-S network topology, according to one or more disclosed examples.

Referring now to FIG. 5, a flow chart is illustrated as an example method 500 that is representative of an automated technique that may be used to detect anomalies in a L-S network topology, in accordance with the disclosed examples. Example method 500 begins at with block 505 where a vertex from the top level of a L-S network topology graph may be selected as the current vertex. Continuing to block 510, a depth-first search (DFS) on the L-S network topology graph may be performed. As indicated at block 515, vertices encountered during the DFS are colored to form subsets representing network devices in different roles (e.g., role of either leaf or spine, as described above).

Continuing to block 520, the even and odd cycles, if any, encountered during the DFS traversal of the L-S network topology graph may be used to identify anomalies in the topology that may represent improper connections. Continuing to block 525, the detected anomalies and vertices visited during the DFS are cataloged to allow, for example, display and analysis of valid and anomalous connections between network devices. Continuing to decision 530, an evaluation is performed to determine if all anomalies have been detected in the L-S network topology graph. If all anomalies have been detected (e.g., the graph has been completely traversed), example method continues to block 535 through the "YES" prong of decision 530 and the DFS traversal of the L-S network topology graph stops. If all anomalies have not been detected, example method continues to block 540 through the "NO" prong of decision 530. In block 540, an unvisited vertex in the L-S network topology graph is selected to continue the depth-first traversal. Flow of example method 500 returns to block 510 where the DFS traversal of the L-S network topology graph (from this next vertex) may repeat until complete.

Figure 6:
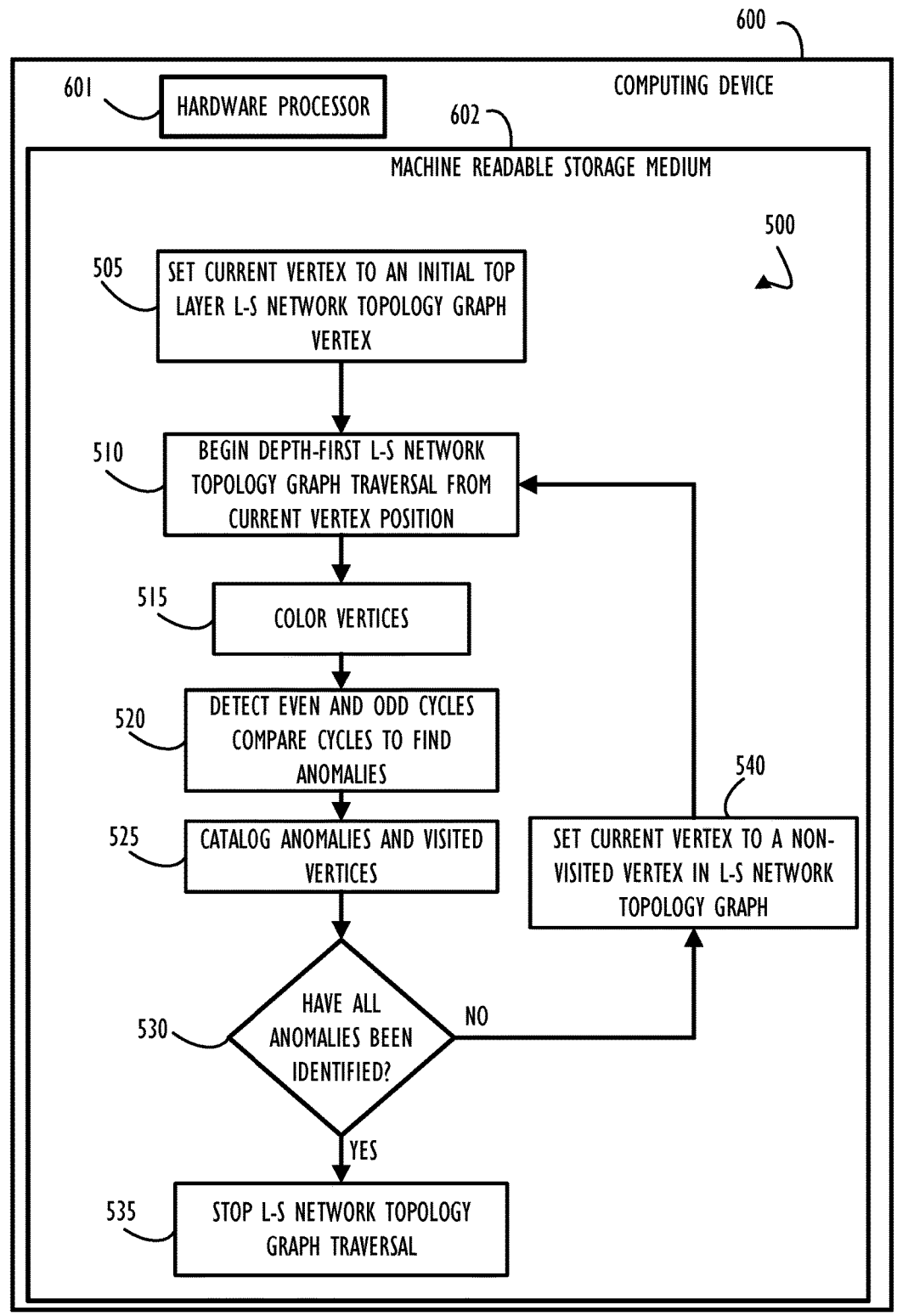
FIG. 6 illustrates an example processor and computer-readable medium used to implement the disclosed L-S network topology anomalies detection algorithm, according to one or more disclosed examples.

Referring to FIG. 6, shown is an example computing device 600, with a hardware processor 601, and accessible machine-readable instructions stored on a machine-readable medium 602 that may be used to implement the disclosed L-S network topology anomalies detection algorithm (e.g., on a network discovery device 120), according to one or more disclosed example implementations. FIG. 6 illustrates computing device 600 configured to perform the flow of method 500 as an example. However, computing device 600 may also be configured to perform the flow of other methods, techniques, functions, or processes described in this disclosure. In the example of FIG. 6, machine-readable storage medium 602 includes instructions to cause hardware processor 601 to perform blocks 505-540 discussed above with reference to FIG. 5.

A machine-readable storage medium, such as 602 of FIG. 6, may include both volatile and nonvolatile, removable and non-removable media, and may be any electronic, magnetic, optical, or other physical storage device that contains or stores executable instructions, data structures, program module, or other data accessible to a processor, for example firmware, erasable programmable read-only memory ("EPROM"), random access memory ("RAM"), non-volatile random access memory ("NVRAM"), optical disk, solid state drive ("SSD"), flash memory chips, and the like. The machine-readable storage medium may be a non-transitory storage medium, where the term "non-transitory" does not encompass transitory propagating signals.

Figure 7:
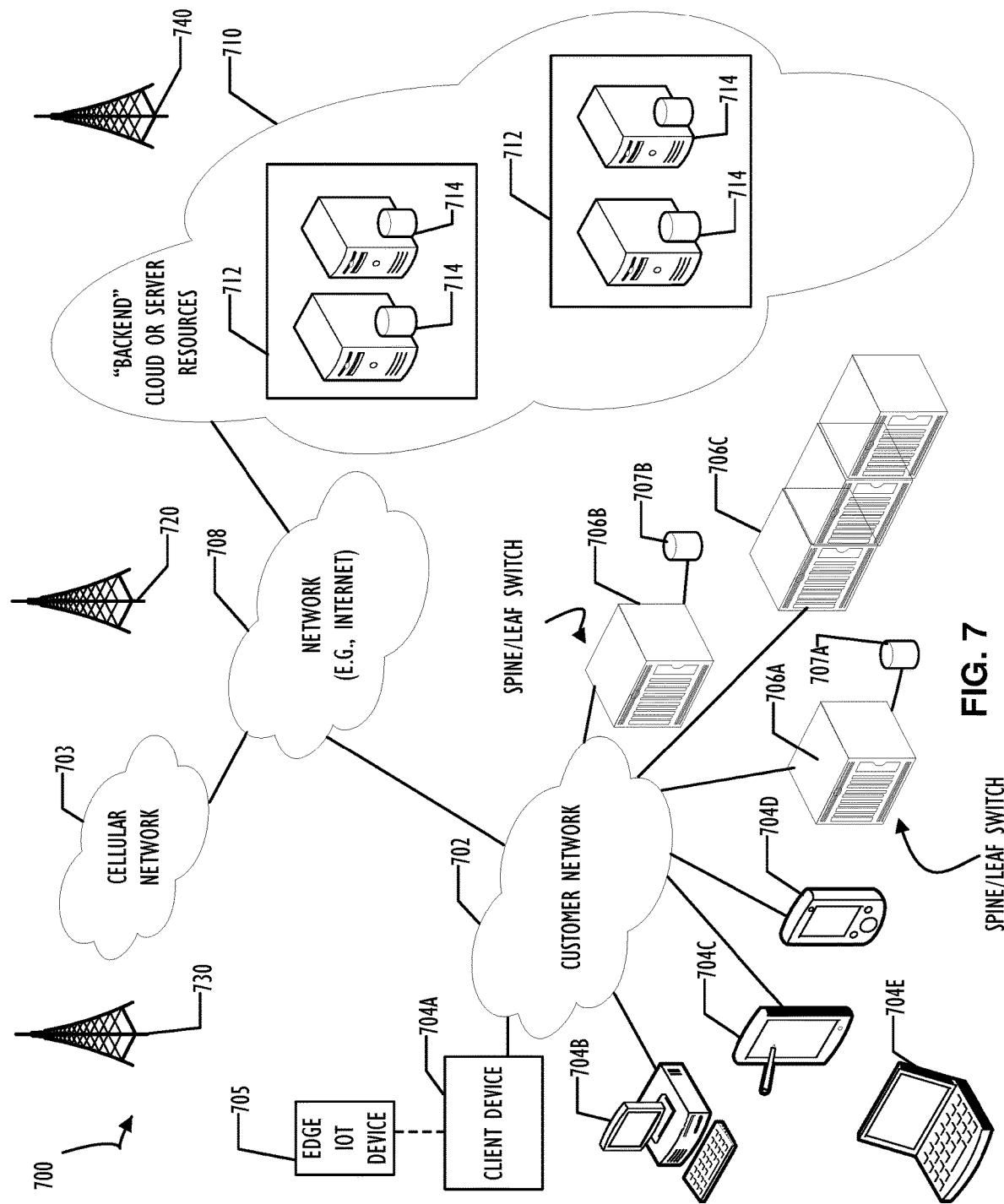
FIG. 7 presents a computer network infrastructure that may be used to implement all or part of the disclosed automatic network device discovery and network topology anomalies detection algorithm (in this example for an expected L-S topology), according to one or more disclosed embodiments.

FIG. 7 represents a computer network infrastructure 700 that may be used to implement all or part of the disclosed automatic network device discovery and L-S network topology anomalies detection algorithm, according to one or more disclosed implementations. Network infrastructure 700 includes a set of networks where implementations of the present disclosure may operate in one or more of the different networks. Network infrastructure 700 comprises a customer network 702, network 708, cellular network 703, and a cloud service provider network 710. In one implementation, the customer network 702 may be a local private network, such as local area network (LAN) that includes a variety of network devices that include, but are not limited to switches, servers, and routers.

Each of these networks may contain wired or wireless programmable devices and operate using any number of network protocols (e.g., transmission communication protocol/Internet protocol commonly called "TCP/IP"), connection technologies (e.g., WiFi® networks, or Bluetooth®), and other mediums. In another implementation, customer network 702 represents an enterprise network that could include or be communicatively coupled to one or more local area networks ("LANs"), virtual networks, data centers and/or other remote networks (e.g., 708, 710). In the context of the present disclosure, customer network 702 may include one or more high-availability switches or network devices using methods and techniques such as those described above (e.g., spine/leaf switch 706A and spine/leaf switch 706B).

As shown in FIG. 7, customer network 702 may be connected to one or more client devices 704A-E and allow the client devices 704A-E to communicate with each other and/or with cloud service provider network 710, via network 708 (e.g., Internet). Client devices 704A-E may be computing systems such as desktop computer 704B, tablet computer 704C, mobile phone 704D, laptop computer (shown as wireless) 704E, and/or other types of computing systems generically shown as client device 704A.

Network infrastructure 700 may also include other types of devices generally referred to as Internet of Things ("IoT") (e.g., edge IOT device 705) that may be configured to send and receive information via a network to access cloud computing services or interact with a remote web browser application (e.g., to receive configuration information).

FIG. 7 also illustrates that customer network 702 includes local compute resources 706A-C that may include a server, access point, router, or other device configured to provide for local computational resources and/or facilitate communication amongst networks and devices. For example, local compute resources 706A-C may be one or more physical local hardware devices, such as the network infrastructure devices outlined above. Local compute resources 706A-C may also facilitate communication between other external applications, data sources (e.g., 707A and 707B), and services, and customer network 702.

Network infrastructure 700 also includes cellular network 703 for use with mobile communication devices. Mobile cellular networks support mobile phones and many other types of mobile devices such as laptops etc. Mobile devices in network infrastructure 700 are illustrated as mobile phone 704D, laptop computer 704E, and tablet computer 704C. A mobile device such as mobile phone 704D may interact with one or more mobile provider networks as the mobile device moves, typically interacting with a plurality of mobile network towers 720, 730, and 740 for connecting to the cellular network 703.

FIG. 7 illustrates that customer network 702 is coupled to a network 708. Network 708 may include one or more computing networks available today, such as other LANs, wide area networks ("WAN"), the Internet, and/or other remote networks, in order to transfer data between client devices 704A-D and cloud service provider network 710. Each of the computing networks within network 708 may contain wired and/or wireless programmable devices that operate in the electrical and/or optical domain.

In FIG. 7, cloud service provider network 710 is illustrated as a remote network (e.g., a cloud network) that is able to communicate with client devices 704A-E via customer network 702 and network 708. The cloud service provider network 710 acts as a platform that provides additional computing resources to the client devices 704A-E and/or customer network 702. In one implementation, cloud service provider network 710 includes one or more data centers 712 with one or more server instances 714. Cloud service provider network 710 may also include one or more frames or clusters (and cluster groups) representing a scalable compute resource that may benefit from the techniques of this disclosure. Also, cloud service providers typically need near perfect uptime availability and may use the disclosed techniques, methods, and systems to provide that level of service.

Figure 8:
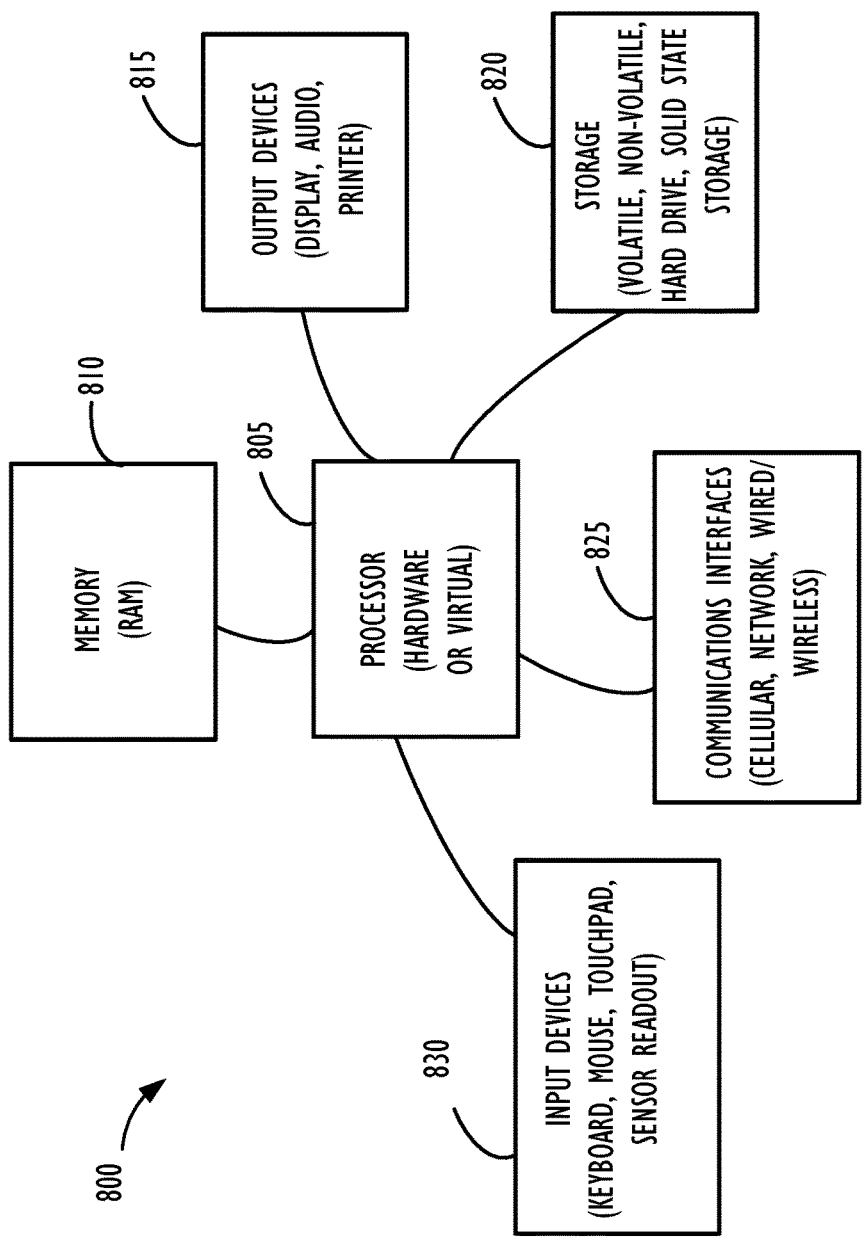
FIG. 8 illustrates a block diagram representation for a computing device that may be used to implement the functions, modules, processing platforms, execution platforms, communication devices, and other methods and processes of this disclosure.

FIG. 8 illustrates a block diagram to represent a computing device 800 that may be used to implement or be used with the functions, modules, processing platforms, execution platforms, communication devices, and other methods and processes of this disclosure. For example, computing device 800 illustrated in FIG. 8 could represent a client device or a physical server device and include either hardware or virtual processor(s) depending on the level of abstraction of the computing device. In some instances (without abstraction), computing device 800 and its elements, as shown in FIG. 8, each relate to physical hardware. Alternatively, in some instances one, more, or all of the elements could be implemented using emulators or virtual machines as levels of abstraction. In any case, no matter how many levels of abstraction away from the physical hardware, computing device 800 at its lowest level may be implemented on physical hardware.

As also shown in FIG. 8, computing device 800 may include one or more input devices 830, such as a keyboard, mouse, touchpad, or sensor readout (e.g., biometric scanner) and one or more output devices 815, such as displays, speakers for audio, or printers. Some devices may be configured as input/output devices also (e.g., a network interface or touchscreen display).

Computing device 800 may also include communications interfaces 825, such as a network communication unit that could include a wired communication component and/or a wireless communications component, which may be communicatively coupled to processor 805. The network communication unit may utilize any of a variety of proprietary or standardized network protocols, such as Ethernet, TCP/IP, to name a few of many protocols, to effect communications between devices. Network communication units may also comprise one or more transceiver(s) that utilize the Ethernet, power line communication ("PLC"), WiFi, cellular, and/or other communication methods.

As illustrated in FIG. 8, computing device 800 includes a processing element such as processor 805 that contains one or more hardware processors, where each hardware processor may have a single or multiple processor cores. In one implementation, the processor 805 may include at least one shared cache that stores data (e.g., computing instructions) that are utilized by one or more other components of processor 805. For example, the shared cache may be a locally cached data stored in a memory for faster access by components of the processing elements that make up processor 805. In one or more implementations, the shared cache may include one or more mid-level caches, such as level 2 (L2), level 3 (L3), level 4 (L4), or other levels of cache, a last level cache ("LLC"), or combinations thereof. Examples of processors include but are not limited to a central processing unit ("CPU") a microprocessor. Although not illustrated in FIG. 8, the processing elements that make up processor 805 may also include one or more of other types of hardware processing components, such as graphics processing units ("GPU"), application specific integrated circuits ("ASICs"), field-programmable gate arrays ("FPGAs"), and/or digital signal processors ("DSPs").

FIG. 8 illustrates that memory 810 may be operatively and communicatively coupled to processor 805. Memory 810 may be a non-transitory medium configured to store various types of data. For example, memory 810 may include one or more storage devices 820 that comprise a non-volatile storage device and/or volatile memory. Volatile memory, such as random-access memory ("RAM"), can be any suitable non-permanent storage device. The non-volatile storage devices 820 can include one or more disk drives, optical drives, solid-state drives ("SSDs"), tap drives, flash memory, read only memory ("ROM"), and/or any other type of memory designed to maintain data for a duration of time after a power loss or shut down operation. In certain instances, the non-volatile storage devices 820 may be used to store overflow data if allocated RAM is not large enough to hold all working data. The non-volatile storage devices 820 may also be used to store programs that are loaded into the RAM when such programs are selected for execution.

Persons of ordinary skill in the art are aware that software programs may be developed, encoded, and compiled in a variety of computing languages for a variety of software platforms and/or operating systems and subsequently loaded and executed by processor 805. In one implementation, the compiling process of the software program may transform program code written in a programming language to another computer language such that the processor 805 is able to execute the programming code. For example, the compiling process of the software program may generate an executable program that provides encoded instructions (e.g., machine code instructions) for processor 805 to accomplish specific, non-generic, particular computing functions.

After the compiling process, the encoded instructions may then be loaded as computer executable instructions or process steps to processor 805 from storage device 820, from memory 810, and/or embedded within processor 805 (e.g., via a cache or on-board ROM). Processor 805 may be configured to execute the stored instructions or process steps in order to perform instructions or process steps to transform the computing device into a non-generic, particular, specially programmed machine or apparatus. Stored data, e.g., data stored by a storage device 820, may be accessed by processor 805 during the execution of computer executable instructions or process steps to instruct one or more components within the computing device 800.

A user interface (e.g., output devices 815 and input devices 830) can include a display, positional input device (such as a mouse, touchpad, touchscreen, or the like), keyboard, or other forms of user input and output devices. The user interface components may be communicatively coupled to processor 805. When the output device is or includes a display, the display can be implemented in various ways, including by a liquid crystal display ("LCD") or a cathode-ray tube ("CRT") or light emitting diode ("LED") display, such as an organic light emitting diode ("OLED") display. Persons of ordinary skill in the art are aware that the computing device 800 may comprise other components well known in the art, such as sensors, powers sources, and/or analog-to-digital converters, not explicitly shown in FIG. 8.

Certain terms have been used throughout this description and claims to refer to particular system components. As one skilled in the art will appreciate, different parties may refer to a component by different names. This document does not intend to distinguish between components that differ in name but not function. In this disclosure and claims, the terms "including" and "comprising" are used in an open-ended fashion, and thus should be interpreted to mean "including, but not limited to . . . ." Also, the term "couple" or "couples" is intended to mean either an indirect or direct wired or wireless connection. Thus, if a first device couples to a second device, that connection may be through a direct connection or through an indirect connection via other devices and connections. The recitation "based on" is intended to mean "based at least in part on." Therefore, if X is based on Y, X may be a function of Y and any number of other factors.

The above discussion is meant to be illustrative of the principles and various implementations of the present disclosure. Numerous variations and modifications will become apparent to those skilled in the art once the above disclosure is fully appreciated. It is intended that the following claims be interpreted to embrace all such variations and modifications.

What is claimed is:

1. A computer-implemented method performed by a computer system comprising a hardware processor, the method comprising:
    obtaining information representative of a defined network topology type for a first computer network, the first computer network including multiple network nodes, each network node of the multiple network nodes having at least one communication connection with at least one other network node of the multiple network nodes;
obtaining information representative of communication connections between the multiple network nodes;
creating a graph representation of a connection topology for the multiple network nodes, the graph representation comprising a plurality of graph nodes representing respective network nodes of the multiple network nodes, and edges between graph nodes of the plurality of graph nodes, the edges representing the communication connections:
automatically assigning respective roles to the plurality of graph nodes according to the defined network topology type and comprising a first role assigned to a first subset of the plurality of graph nodes, and a different second role assigned to a second subset of the plurality of graph nodes; and
analyzing the respective roles assigned to the plurality of graph nodes and the edges of the graph representation to identify an anomalous connection between network nodes that does not conform to the defined network topology type, wherein the identifying of the anomalous connection comprises:
detecting, in the graph representation, an edge between graph nodes assigned a same role, detecting an odd cycle in the graph representation based on the edge detected between the graph nodes assigned the same role, the odd cycle comprising an odd number of edges to complete a cycle between a group of graph nodes in the graph representation, and
comparing the odd cycle to an even cycle in the group of graph nodes.

2. The computer-implemented method of claim 1, wherein the graph representation comprises a bipartite graph, and the analyzing of the respective roles assigned to the plurality of graph nodes to identify the anomalous connection uses a bi-colorable graph technique.

3. The computer-implemented method of claim 1, wherein the defined network topology type is a leaf-spine network topology type, the first role is a leaf node role, and the second role is a spine node role.

4. The computer-implemented method of claim 1, further comprising:
displaying the graph representation as a visual representation on a display device, the visual representation having a first color for each graph node of the first subset assigned the first role, and a different second color for each graph node of the second subset assigned the second role.

5. The computer-implemented method of claim 1, wherein the obtaining of the information representative of the communication connections comprises discovering, using a network discovery device, active communication connections between the multiple network nodes.

6. The computer-implemented method of claim 4, wherein the identifying of the anomalous connection comprises detecting graph nodes having a same color connected by the edge.

7. The computer-implemented method of claim 1, wherein the obtaining of the information representative of the communication connections comprises obtaining information from a stored set of attributes for off-line analysis of communication connections for the first computer network.

8. The computer-implemented method of claim 1, wherein the even cycle in the group of graph nodes comprises edges between graph nodes in the group of graph nodes, excluding an edge between graph nodes assigned the same role.

9. A computer system comprising: a processor; and a non-transitory storage medium storing instructions executable on the processor to: obtain information representative of a defined network topology type for a first computer network, the first computer network including multiple network nodes, each network node of the multiple network nodes having at least one communication connection with at least one other network node of the multiple network nodes: obtain information representative of communication connections between the multiple network nodes; create a graph representation of a connection topology for the multiple network nodes, the graph representation comprising a plurality of graph nodes representing respective network nodes of the multiple network nodes, and edges between graph nodes of the plurality of graph nodes, the edges representing the communication connections; automatically assign respective roles to the plurality of graph nodes according to the defined network topology type and comprising a first role assigned to a first subset of the plurality of graph nodes, and a different second role assigned to a second subset of the plurality of graph nodes; and
analyze the respective roles assigned to the plurality of graph nodes and the edges of the graph representation to identify an anomalous connection between network nodes that does not conform to the defined network topology type, wherein instructions to identify the anomalous connection comprise instructions to:
detect, in the graph representation, an edge between graph nodes assigned a same role,
detect an odd cycle in the graph representation based on the edge detected between graph nodes assigned the same role, the odd cycle comprising an odd number of edges to complete a cycle between a group of graph nodes in the graph representation, and
compare the odd cycle to an even cycle in the group of graph nodes.

10. The computer system of claim 9, wherein the graph representation comprises a bipartite graph, and the analyzing of the respective roles
assigned to the plurality of graph nodes to identify the anomalous connection uses a bi-colorable graph technique.

11. The computer system of claim 9, wherein the defined network topology type is a leaf-spine network topology type, the first role is a leaf node
role, and the second role is a spine node role.

12. A non-transitory computer-readable medium comprising instructions that when executed cause a computer system to: obtain information representative of a defined network topology type for a first computer network, the first computer network including multiple network nodes, each network node of the multiple network nodes having at least one communication connection with at least one other network node of the multiple network nodes; obtain information representative of communication connections between the multiple network nodes; create a graph representation of a connection topology for the multiple network nodes, the graph representation comprising a plurality of graph nodes representing respective network nodes of the multiple network nodes, and edges between graph nodes of the plurality of graph nodes, the edges representing the communication connections: automatically assign respective roles to the plurality of graph nodes according to the defined network topology type and comprising a first role assigned to a first subset of the plurality of graph nodes, and a different second role assigned to a second subset of the plurality of graph nodes; and analyze the respective roles assigned to the plurality of graph nodes and the edges of the graph representation to identify an anomalous connection between network nodes that does not conform to the defined network topology type, wherein the instructions to identify the anomalous connection comprise instructions to:

detect, in the graph representation, an edge between graph nodes assigned a same role, detect an odd cycle in the graph representation based on the edge detected between graph nodes assigned the same role, the odd cycle comprising an odd number of edges to complete a cycle between a group of graph nodes in the graph representation, and compare the odd cycle to an even cycle in the group of graph nodes.

13. The non-transitory computer-readable medium of claim 12, wherein the even cycle in the group of graph nodes comprises edges between graph nodes in the group of graph nodes, excluding an edge between graph nodes assigned the same role.

14. The computer system of claim 9, wherein the even cycle in the group of graph nodes comprises edges between graph nodes in the group of graph nodes, excluding an edge between graph nodes assigned the same role.

15. The computer implemented method of claim 1, wherein comparing the odd cycle to the even cycle comprises comparing connections that exit in the odd cycle and are not present in a shortest even path in the group of graph nodes.

16. The computer system of claim 9, wherein comparing the odd cycle to the even cycle comprises comparing connections that exit in the odd cycle and are not present in a shortest even path in the group of graph nodes.

17. The non-transitory computer-readable medium of claim 12, wherein comparing the odd cycle to the even cycle comprises comparing connections that exit in the odd cycle and are not present in a shortest even path in the group of graph nodes.

\* \* \* \* \*